United States Patent
Cawood

[11] 3,942,067
[45] Mar. 2, 1976

[54] MULTI-GUN CATHODE RAY TUBE CONVERGENCE SYSTEM

[75] Inventor: George H. Cawood, Ormond Beach, Fla.

[73] Assignee: General Electric Company, Fairfield, Conn.

[22] Filed: June 21, 1974

[21] Appl. No.: 481,761

[52] U.S. Cl. ............................ 315/13 C; 315/368
[51] Int. Cl.² .................... H01J 29/50; H01J 31/00
[58] Field of Search............ 315/13 C, 30, 368, 370

[56] References Cited
UNITED STATES PATENTS

| | | | |
|---|---|---|---|
| 2,831,145 | 4/1958 | Albert et al. | 315/370 |
| 3,501,669 | 3/1970 | Henderson | 315/370 |
| 3,577,031 | 5/1971 | Welsh et al. | 315/13 C |
| 3,613,108 | 10/1971 | Spannhake | 315/13 C |
| 3,708,715 | 1/1973 | Rhee | 315/30 |

Primary Examiner—Maynard R. Wilbur
Assistant Examiner—T. M. Blum
Attorney, Agent, or Firm—Allen E. Amgott; Raymond H. Quist

[57] ABSTRACT

The beams from a plurality of off-axis guns aimed through a common deflection volume, as used in shadow-mask color cathode-ray tubes, even if made by constant convergence fields to converge at a given distance in the absence of deflection, will diverge when a common deflection field is applied; and the distance from the deflection zone to different parts of the screen is generally not constant.

Therefore the convergence field applied to each must vary as the beams are deflected to different screen areas. Prior art schemes to do this have employed functions of the form $AY + BY^2 + CX + DX^2$, where Y is the vertical deflection and X is the horizontal deflection. The present invention produces a function $AY + BY^2 + CX + DX^2 + EXY$, or alternatively this function plus $FY_+^3$ where $Y_+$ is only the positive value of Y. The square and cube functions are produced by the use of multiplier circuits.

4 Claims, 2 Drawing Figures

MULTI-GUN CATHODE RAY TUBE CONVERGENCE SYSTEM

BACKGROUND OF THE INVENTION

1. Field of the Invention

This invention pertains to cathode-ray tube deflection systems, and more particularly to precise deflection convergene systems for shadow-mask multi-gun mixed-color cathode ray tubes.

2. Summary of the Prior Art

Color television being the commercial reason for making color kinescopes, the conventional tube and its associated circuits economically perform adequately for use in the 525-line raster, 60-hertz field, 30-hertz frame, interlaced system standard in the jurisdiction of the U.S. Federal Communications Commission. Dots of screen materials cathodo luminescent in three different colors are applied to the tube face in a regular pattern; three differently glowing dots always have the same relative position and each such dot is protected from the edge of an incident beam directed to another spot by a perforated shadow mask which permits a beam to bombard with its high-density core the luminescent spot at which it is aimed, while its low density edge is caught by the mask. With such a structure it is preferred for simplicity to use three separate electron guns, one for each color, in order that variously proportioned mixtures of two or all three of the different colors available from the three kinds of dots may be provided by appropriate modulation of the beam from each separate gun, rather than by the complex feat of time distribution, over the different kinds of dots, of the beam from a single gun. The three separate guns are located symmetrically around the central axis of the tube, each with the gun axis coplanar with the central axis of the tube. Conventionally, each gun is provided with a focussing permanent magnet, known as a "color purity" magnet, to collimate its electron beam as nearly perfectly as may be, and each of the three beams is then caused to pass through the field of a deflecting magnet, known as a static convergence (or, for brevity, convergence) magnet, which is so adjusted that its associated electron beam will pass through a deflection volume common to all three beams, and then, in the absence of any deflecting field in the deflection volume, will converge to a "point" on the screen to which the other two beams also converge. This "point" is in fact an area unit containing three spots, each luminescent in a different color; and the convergence magnet for each gun is adjusted to cause its beam to impinge through the proper shadow mask aperture upon a spot whose luminescence color is associated with that gun. From the observer's viewpoint the "point" area unit appears, at normal viewing distance, to be truly a point, since the spacing of the three spots is necessarily less than the resolution capability of the normal human eye in order that mixtures of light from two or three differently colored spots will appear as a single visible spot of a single color produced by the blending. When a deflection yoke, conventionally external to the tube envelope around the deflection volume, produces in the volume a magnetic deflecting field substantially uniform over the volume, the three electron beams will all be deflected, to a first approximation, through the same angle, and will move appropriately to the same three-dot "point" or area unit, each beam arriving at its appropriate phosphor dot.

Practical considerations impair this first approximation. First, because the beams from the different guns enter the deflection volume at an angle with the tube axis, each will be deflected slightly differently, and they will not converge all over a screen even if it is spherical with its center in the deflection volume, so that all parts of the screen are at the same distance from the place where deflection occurs. Secondly, the radius of the spherical segment which is the tube face is conventionally greater than the distance from the virtual center in the deflection volume where the axes of the three beams, extended backward from their convergence point would intersect. Consequently, if the beams are deflected off the tube central axis, around which the three electron guns are disposed, they will actually converge before reaching the screen, and will diverge beyond that convergence point, where they reach the screen. To compensate for this it is necessary to add to the constant field from each convergence magnet a field which is a function of the deflection caused by the field of the deflection yoke. This may be done by a winding on the structure of the convergence magnet, whose constant field may be provided by a continuous current either as a component of the total current in the same winding, or in a separate winding. The prior art discloses the use of separate windings to receive separately currents corrective of the effects of vertical and of horizontal deflection. Since windings on magnetic structures are necessarily inductive, producing lags between an applied voltage and the current it produces, ingenious circuitry is, in general, applied to produce adequately close approximation to ideal current wave forms with economically feasible applied voltages. The problem is simpler for fixed horizontal and vertical deflection frequencies, such as occur in television receivers, then for instruments in which these frequencies may be required to be varied.

Television Engineering Handbook, ed. D. G. Fink, McGraw-Hill Book Company, New York, 1957, pp 6–75 through 6–80, and chapter 6 in general, discloses that in a simplified case the required dynamic convergence fluxes (and hence currents) are proportional to squares plus linear functions of the vertical and horizontal deflection amplitudes. Welsh and McCormick, U.S. Pat. No. 3,557,031, column 9, line 45 through colume 10, line 44, similarly describe the required functions for convergence as composed of a sum of a square and a linear function of the vertical deflection and a sum of a square and a linear function of the horizontal deflection. The square functions required are produced by full-wave rectification of the respective deflection voltages, following by a non-linear circuit to give the required square characteristic. Spannhake, U.S. Pat. No. 3,613,108, teaches the addition, to convergence currents of the square plus linear nature, certain inputs from a pincushion distortion correction circuit provided for improving the deflection circuitry to make a more nearly rectangular raster for television. Rhee, U.S. Pat. No. 3,708,715, teaches particular means to combine parabolic and linear wave forms.

None of the published prior art known to me discloses the provision of a product of the vertical and horizontal deflection amplitudes as a component of the convergence correction function, nor the use of cubic functions.

BRIEF SUMMARY OF THE INVENTION

The present invention provides a convergence function of five terms: square and linear terms of both the vertical and the horizontal deflection amplitudes, and a term proportional to the product of the vertical and horizontal deflection amplitudes. To avoid dependence upon the accuracy of a reactive circuit in producing outputs accurately proportional to the square of an amplitude, the square functions are produced by connecting the voltage (or current) whose amplitude is to be squared to both of the factor input terminals of a multiplier. This is basically advantageous in that reliance is placed simply in staying within the workable range of a device—the multiplier—rather than in combining reactive devices in a critical relation. Variable transconductance semiconductor multipliers are commercially available; an example is the AD530 manufactured by Analog Devices, Inc., 221 Fifth St., Cambridge, Mass. 02142. The essential characteristic of a multiplier is that if one of its two inputs is maintained constant, its output will be a linear function of the signal applied to the other input; and its output will thus be proportional to the product of the signals applied to its two inputs. Unlike reactive devices, it will not be frequently sensitive.

The amplitudes of the two square terms, the two linear terms, and of the product terms, are adjusted appropriately (conveniently by potentiometers), mixed resistively, and fed as inputs to a driver amplifier which feeds the convergence coil. To make the current through the convergence coil better follow the applied input, a sensor resistor is connected between the return terminal of the convergence coil and ground; and the drop across the sensor resistor is fed back, through a mixing resistor, to the input of the driver amplifier.

With a cathode-ray tube having a 25-inch diagonal screen, maximum convergence errors at the extreme corners of a conventional raster of three-fourths aspect ratio were found to be of the order of 0.05 inches, using a system as here described. This was achieved not only with a horizontal sweep frequency of the conventional 15,750 hertz, but also in a special setup with a horizontal sweep frequency of 28,350 hertz.

It has been found empirically that some improvement in performance may be achieved by adding to the five-term convergence correction current already described a sixth term proportional to the cube of the positive vertical deflection signal. This is produced by the use of a half-wave rectifier to obtain the positive vertical deflection voltage. This is used as one input to a multiplier whose other input is the $Y^2$ function already generated, producing the desired $Y^3$. This additional correction reduces convergence errors in the central part of the raster to 0.01 inches, although the errors at the corners remain 0.05 inches.

DESCRIPTION OF THE PREFERRED EMBODIMENT

Figure 1:
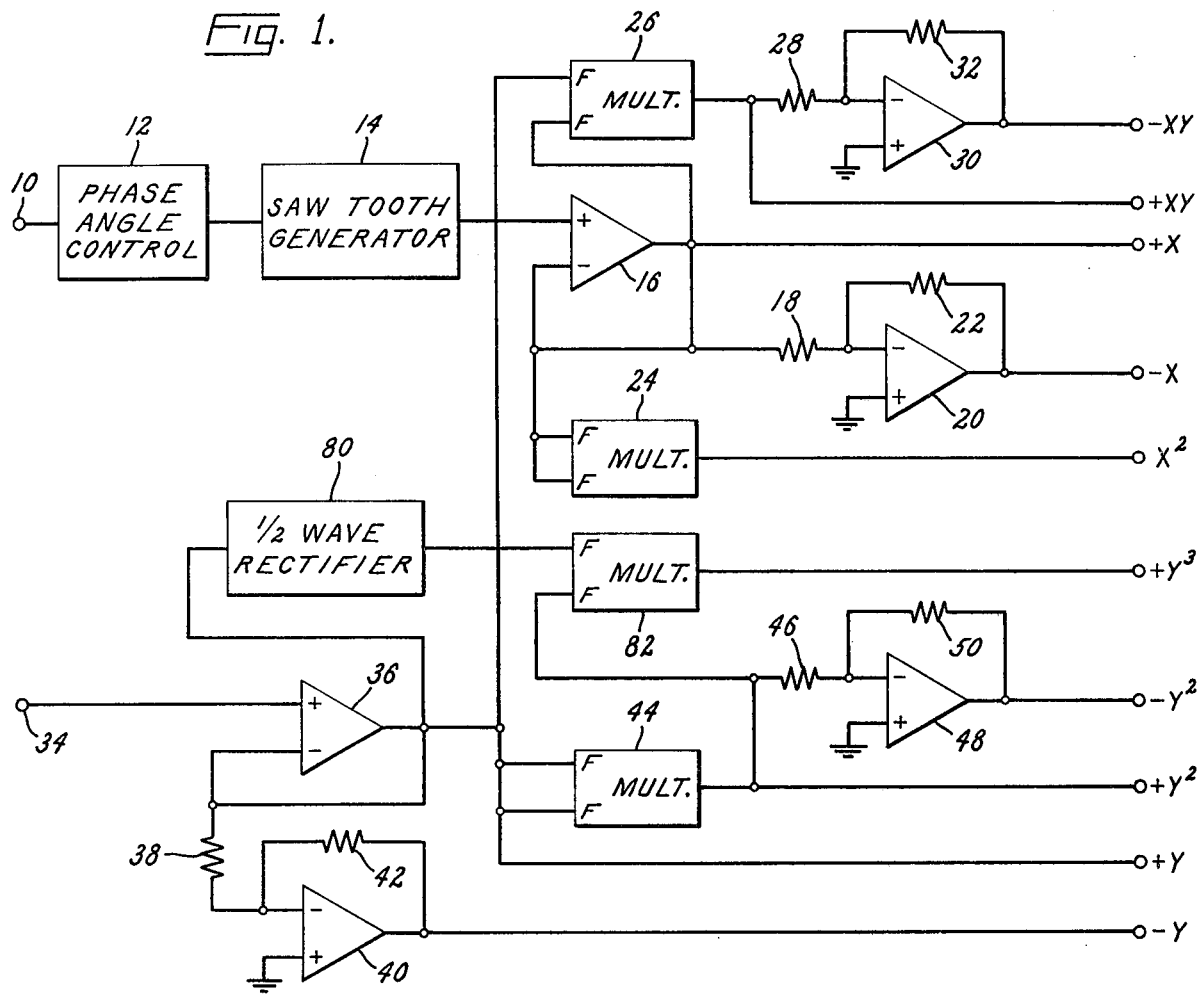
FIG. 1 represents schematically circuitry for producing various functions of the horizontal and vertical deflection signals, of which only one is required.

Referring to FIG. 1, terminal 10 is connected to a source of horizontal deflection signals, not shown, and conducts these to a phase angle control 12, whose output is fed to a sawtooth wave generator 14. These are not an essential part of the invention, but have the virtue of permitting the device to function with an incoming wave form that is imperfectly linear (such, for example, as the applied voltage may be in a reactive circuit whose current is linear). The output of sawtooth wave generator 14 is fed as an input to the additive terminal of an operational differential amplifier 16. The output of differential amplifier 16 is connected via resistor 18 to the subtractive input of operational differential amplifier 20, whose additive input terminal is at ground. The output terminal of differential amplifier 20 is connected via resistor 22 to its subtractive input terminal. The effect of the feedback network formed of resistors 18 and 22 is that operational differential amplifier 20 functions as an inverter; if the output of amplifier 16 be called $+X$, the output of amplifier 20 is $-X$. Producing a bipolar output in this fashion permits feeding it to a potentiometer which can then adjust not only amplitude but sign.

The output of amplifier 16 is also connected to both factor input terminals (i.e., multiplier and multiplicand) of multiplier 24, whose output is thus made to be $X^2$. The output of amplifier 16 is also connected to one factor input terminal of a similar multiplier 26, whose output is connected via resistor 28 to the subtractive input of operational differential amplifier 30, whose output is fed back via resistor 32 to its subtractive input terminal; the positive input terminal of 30 being grounded, it operates as an inverter of the output of multiplier 26. A $+Y$ input, whose derivation will be described hereinafter, is connected to the other factor input terminal of multiplier 26, so that the output of 26 is $XY$, and the output of amplifier 30 is $-XY$, the two outputs being effectively a single bipolar output.

Terminal 34 is connected to an external source, not shown, of A sawtooth vertical deflection signal. As represented in FIG. 1, this constitutes a waiver of the option of providing a phase control and a sawtooth wave generator, analogous to 12 and 14, respectively, for the vertical or Y signal. Since the frequency of vertical deflection signals in standard television rasters is only a very small fraction of the horizontal deflection frequency, phase errors and current distortion relative to applied voltage tend to be negligible, so that the precautions embodied in 12 and 14 are usually not required for vertical deflection. Obviously, they may be provided if needed.

The vertical deflection signal, assumed truly sawtooth, is fed from terminal 34 to the additive input terminal of operational differential amplifier 36, whose output terminal is connected to its own subtractive input terminal and, via resistor 38 to the subtractive input terminal of operational differential amplifier 40, whose additive input terminal is grounded, and whose output is connected, inter alia, via resistor 42 to its subtractive input terminal. The output of amplifier 36 is thus identifiable as $+Y$, and of amplifier 40 (recognizable as an inverter) as $-Y$, the combination being a bipolar output. The output of amplfiier 36 is connected to both the multiplier and multiplicand factor inputs of multiplier 44, which thus multiplies the $+Y$ output of amplifier 36 by itself to produce $Y^2$. This output $Y^2$ is fed via resistor 46 to the subtractive input terminal of operational differential amplifier 48, whose additive input terminal is grounded. The output terminal of amplifier 48 is connected via resistor 50 to its subtractive input terminal, so that 48 constitutes an inverter whose $-Y^2$ output, taken together with the $Y^2$ output of multiplier 44, is a bipolar $Y^2$ signal.

The output, +Y, of amplifier 36 is also connected to a factor input terminal of multiplier 26, as was noted previously together with the promise, now fulfilled, that the origin of the +Y signal would be disclosed.

Figure 2:
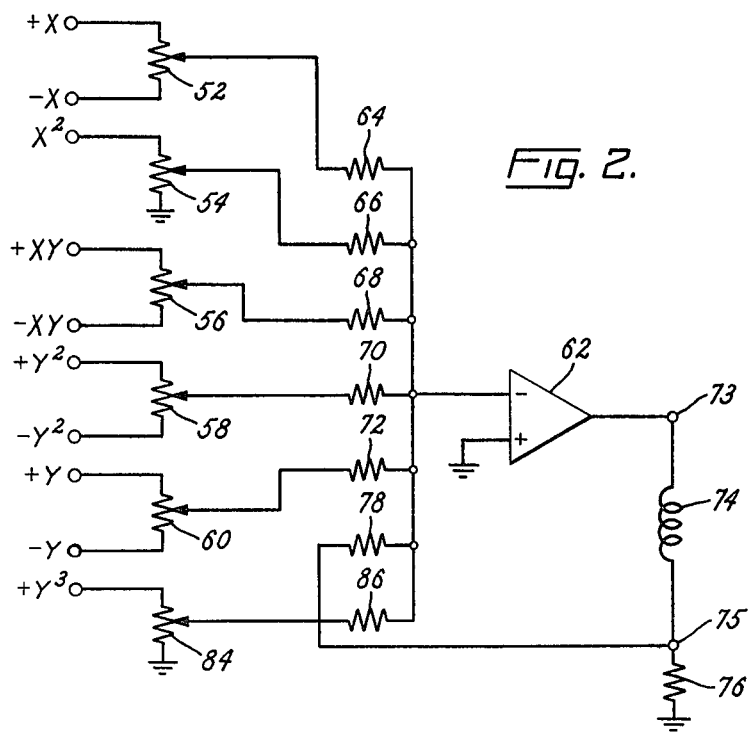
FIG. 2 represents a driver circuit, of which one is required for each electron gun of the multi-gun cathode ray tube for which the invention is intended.

For clarity in prefernce to elegance, the output terminals at which + and − X and Y, and + and − $X^2$ and $Y^2$, and + and − XY, appear to have been marked with the designations indicated. In FIG. 2, potentiometer (or, more correctly, adjustable voltage dividers) 52, 54, 56, 58, and 60 have their input terminals similarly marked to indicate connection to the like marked output terminals in FIG. 1. The output of each of the indicated potentiometers is connected via a resistor to the subtractive input of amplifier-driver 62, whose additive input is at ground. (The individual resistors are numbered 64, 66, 68, 70, and 72.) The output terminal of amplifier-driver 62 is connected to one terminal 73 of convergence coil 74, whose other terminal is connected to terminal 75 of sense resistor 76, which is grounded at its opposite terminal. Terminal 75 of sense resistor 76 is connected via resistor 78 to the subtractive input terminal of amplifier 62.

The embodiment thus far described is operative, and is one form of my invention. For any further discussion, it will be called the first embodiment. Each of the electron guns will require a separate embodiment according to FIG. 2, including amplifier driver 62, with voltage dividers 52, 54, 56, 58, and 60, mixing resistors 64, 66, 68, 70, 72, and 78, and sense resistor 76; but the inputs to the voltage dividers for each gun may come from common X, $X^2$, XY, Y, and $Y^2$ sources according to the representation of FIG. 1. The necessity for separate voltage dividers for each electron gun appears from the following table of typical voltages, peak-to-peak, at the output terminals of the voltage dividers providing analogues of the functions indicated. The column heatings indicate the color produced by the gun whose convergence coil driver is fed the potentials listed.

|       | Red   | Green | Blue  |
|-------|-------|-------|-------|
| $X^2$ | +1.5  | +1.5  | +6.0  |
| X     | +5.5  | +1.0  | −1.8  |
| Y     | −4.0  | −1.8  | +3.5  |
| $Y^2$ | −0.8  | −0.5  | +0.4  |
| XY    | ±1    | ±1    | —     |

The following additions turn the first embodiment into the second embodiment. In FIG. 1, the output of amplifier 36 is connected to half-wave rectifier 80, which passes only the positive part of the Y signal to a factor input terminal of multiplier 82, whose other factor input terminal receives an input $Y^2$ from the output of multiplier 44. The output of multiplier 82 is obviously $Y \times Y^2 = Y^3$. This signal is applied in FIG. 2 to one terminal of potentiometer 84, whose other terminal is grounded. Its output arm is connected via resistor 86 to the input of amplifier-driver 62. The first embodiment, with the addition of the components described in the present paragraph, becomes the second embodiment of my invention. When the second embodiment is employed, each "RED" and "GREEN" amplifier-driver 62 will have associated with it a voltage divider 84 and mixing resistor 86. Typical suitable potentials (in volts, peak-to-peak) produced at the outputs from dividers 90 are

| RED  | GREEN | BLUE |
|------|-------|------|
| +1.8 | +1.8  | 0    |

It will be observed that the convergence coil for the "blue" gun has zero amplitude for certain terms in the correction current. This presumably results from the fact that the axis of that gun lies in the plane of the vertical deflection, in conventional color tube design and application.

While the description of my invention has been directed to a conventional rectangular raster, as used in television, the absence of any reactive components in my device will permit its use with some other kind of deflection. For example, a plan position indicator sweep may be produced by suitably slow sine and cosine modulation of a sawtooth. By selecting the target return signals according to desired classes, and applying signals for a given class to the control grid of a gun exciting a given color, targets in different classes may be presented in different colors. Since my invention employs no reactive components, and hence is not frequency sensitive it can provide proper convergence correction to a device employing even a scan so radically different from conventional televison scanning patterns.

Since the availability of integrated circuits leads to the use of a number of components of like generic description which must be distinguished by the somewhat artificial means of original numbering, the appended claims have, in many instances, the reference number employed in the drawings included in parenthesis to facilitate their understanding. However, the various resistors 64, 66, 68, 70, 72, and 78 have been described simply as "resistive input mixing means" in claim 1, (f). In claims 2 and 3, resistor 86 is also included in the generic term "resistive input mixing means." This use of reference character is purely to facilitate comprehension, and is not intended to have any effect upon the scope of the claims. (Manual of Patent Examining Procedure 608.01 (m))

I claim:

1. A convergence circuit for a three-gun color cathode-ray tube comprising:
   a. a horizontal deflection signal terminal adapted to be connected to a source of horizontal deflection signal;
   b. a vertical deflection signal terminal adapted to be connected to a source of vertical deflection signal;
   c. amplifier driver means (62)
   d. first convergence coil terminal (73) connected to the output of amplifier driver means and adapted to be connected to a first terminal of a convergence coil for a gun of a three-gun color cathode-ray tube;
   e. second convergence coil terminal (75) adapted to be connected to a second terminal of the said convergence coil;

f. resistive input mixing means having a plurality of separate signal inputs and a common terminal which is connected to the input of amplifier driver means;
g. sensing resistor means having one terminal connected to the second convergence coil terminal and to a separate input of resistive input mixing means, and another terminal connected to ground;
h. first inverter means (20) connected to the horizontal deflection signal terminal to produce at its output the negative of a horizontal deflection signal;
i. first voltage divider means (52) having two input terminals, of which one is connected to the horizontal deflection signal terminal and the other is connected to receive the output of first inverter means, and having an output terminal connected to a separate input of resistive input mixing means;
j. first multiplier means (24) having two factor input terminals both connected to horizontal deflection signal terminal to produce as an output a signal proportional to the square of a horizontal deflection signal;
k. second voltage divider means (54) having two input terminals, of which one is connected to the output of first multiplier means and the other is connected to ground, and having an output terminal connected to a separate input of resistive input mixing means;
l. second inverter means (40) connected to the vertical deflection signal terminal to produce as its output the negative of a vertical deflection signal;
m. third voltage divider means (60) having two input terminals, of which one is connected to the vertical deflection signal terminal and the other is connected to the output of second inverter means, and having an output terminal connected to a separate input of resistive input mixing means;
n. second multiplier means (44) having two factor input terminals both connected to the vertical deflection signal terminal to produce as an output a signal porportional to the square of a vertical deflection signal;
o. third inverter means (48) connected to the output of second multiplier means to produce as an output the negative of its output;
p. fourth voltage divider means (58) having two input terminals, of which one is connected to the output of second multiplier means and the other is connected to the output of third inverter means, and having an output terminal connected to a separate unit of resistive input mixing means;
q. third multiplier means (26) having two factor input terminals, of which one is connected to the horizontal deflection signal terminal and the other is connected to the vertical deflection signal terminal to produce as an output a signal proportional to the product of a horizontal deflection signal by a vertical deflection signal;
r. fourth inverter means (30) connected to the output of third multiplier means to produce as an output the negative of the output of third multiplier means;
s. fifth voltage divider means (56) having two input terminals, of which one is connected to the output of third multiplier means an the other is connected to the output of fourth inverter means, and having an output terminal connected to a separate input of resistive mixing means.

2. The convergence circuit claimed in claim 1, further comprising:
t. rectifier means (80) connected to vertical deflection signal terminal to produce as an output only the positive portion of a vertical deflection signal;
u. fourth multiplier means (82) having two factor input terminals, of which one is connected to the output of rectifier means and the other is connected to the output of second multiplier means, and having an output connected to a separate input (86) of resistive input mixing means.

3. The convergence circuit claimed in claim 1, further comprising:
t. rectifier means (80) connected to vertical deflection signal an an input, and producing as an output only positive portion of vertical deflection signal;
u. fourth multiplier means (82) having two factor input terminals of which one is connected to the output of rectifier means and the other is connected to the output of second multiplier means to produce as an output a signal proportional to the cube of the positive portion of vertical deflection signal;
v. sixth voltage divider means (84) having two input terminals of which one is connected to the output of fourth multiplier means and the other is connected to ground, and having an output terminal connected to a separate input (86) of resistive mixing means.

4. In a convergence circuit for a multi-gun cathode-ray tube comprising means for providing a correction circuit of the form $AY + BY^2 + CX + DX^2 + EXY$, where X and Y are proportional to the horizontal and vertical deflection magnitudes, respectively, and A, B, C, D, and E are constants, the improvement comprising means for providing in the correction current a further component $FY(positive)^3$ where F is a constant and $Y(positive)^3$ is the cube of only the positive values of Y.

* * * * *

UNITED STATES PATENT OFFICE
CERTIFICATE OF CORRECTION

Patent No. 3,942,067  Dated March 2, 1976

Inventor(s) George H. Cawood

It is certified that error appears in the above-identified patent and that said Letters Patent are hereby corrected as shown below:

In the claims, claim 1, paragraphs p. and s. should appear as follows p. fourth voltage divider means (58) having two input terminals, of which one is connected to the output of second multiplier means and the other is connected to the output of third inverter means, and having an output terminal connected to a separate input of resistive input mixing means;

s. fifth voltage divider means (56) having two input terminals, of which one is connected to the output of third multiplier means and the other is connected to the output of fourth inverter means, and having an output terminal connected to a separate input of resistive mixing means.

Claim 3, paragraph t. should appear as follows:

t. rectifier means (80) connected to vertical deflection signal as an input, and producing as an output only positive portion of vertical deflection signal;

Claim 4, should appear as follows:

4. In a convergence circuit for a multi-gun cathode-ray tube comprising means for providing a correction current of the form $AY + BY^2 + CX + DX^2 + EXY$, where X and Y are proportional to the horizontal and vertical deflection magnitudes, respectively, and A, B, C, D, and E are constants, the improvement comprising means for providing in the correction current a further component $FY(positive)^3$ where F is a constant and $Y(positive)^3$ is the cube of only the positive values of Y.

Signed and Sealed this fourth Day of May 1976

[SEAL]

Attest:

RUTH C. MASON  
Attesting Officer

C. MARSHALL DANN  
Commissioner of Patents and Trademarks